May 6, 1952   J. W. GRIFFIN ET AL   2,595,784
REPAIRMAN'S CREEPER
Filed Sept. 15, 1949

INVENTOR.
JOHN W. GRIFFIN
BY SANFORD S. LAZARUS

West & Oldham
ATTORNEYS

Patented May 6, 1952

2,595,784

UNITED STATES PATENT OFFICE 2,595,784

REPAIRMAN'S CREEPER

John W. Griffin, Cleveland, and Sanford S. Lazarus, Canton, Ohio; said Griffin assignor to Richard Luntz, Shaker Heights, Ohio Application September 15, 1949, Serial No. 115,878

2 Claims. (Cl. 280—61.5)

This invention relates to creeper devices, especially to a creeper such as is used by an automotive repairman, and wherein the creeper is adapted for use either as a support seat or as a conventional creeper, or as a stand.

Heretofore creepers commercially available have comprised a support platform that has some type of caster means used to support the platform so that a person lying on the platform can readily move the creeper around to a desired location.

Normally a person would lie on his back on the creeper and would work from such a lying position although in some instances the repairman might sit on the creeper and attempt to work from such a sitting position. However, the creeper would not function satisfactorily as a support for the repairman, when sitting on the creeper, since the repairman normally would be positioned too low with relation to an automotive vehicle for performing any work on the vehicle and the creeper would move around too much while the worker was sitting thereon. Also, it is uncomfortable to sit practically upon the floor and attempt to work from such a position.

Automotive repairmen frequently are called upon to work around a vehicle at a distance of one or two feet above the floor and it has been difficult for the repairmen to assume a comfortable working position when working at this height.

The general object of the present invention is to avoid the foregoing difficulties and other disadvantages of previous types of creeper constructions and to provide a novel creeper which is adapted to function both as a creeper and as a support seat and as a support or a stand on which a workman may stand.

Another object of the invention is to provide a creeper that has a seat support pivotally associated therewith adapted to lock the creeper and prevent it from rolling when the seat is swung up to operative position.

Another object of the invention is to provide a relatively inexpensive, easily assembled creeper of novel construction.

A further object of the invention is to provide a creeper which has a movable seat support adapted to be swung between two extremities of position on a creeper and to function as a seat in one position and to function as a head rest for the creeper when in another position.

Yet a further object of the invention is to provide a seat support on a creeper which is secured to the creeper by support arms that are in pivotal engagement with both the creeper and the seat support, which arms have integral extensions for locking the creeper in a given position when the seat support is brought into operative position and contact each other to position the seat support for use as a head rest.

The foregoing and other objects and advantages of the invention will be made more apparent as the specification proceeds.

The creeper of this invention may have an endless, or substantially endless loop type on an edge frame substantially as shown in J. W. Griffin's copending application Ser. No. 760,046, filed July 10, 1947.

Reference should be had to the accompanying drawings for a better understanding of the invention and wherein.

In order to simplify identification of corresponding parts in the different figures of the drawings and in the specification, corresponding numerals will be used to identify similar parts in the drawings and specification.

Figure 1:
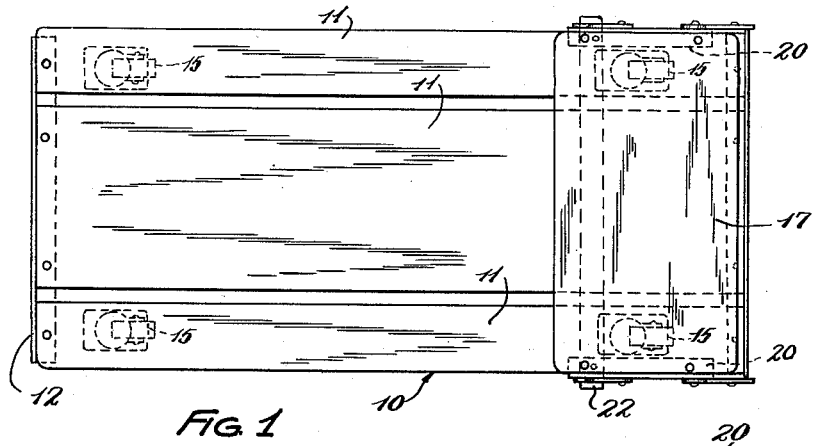
Fig. 1 is a plan view of a creeper embodying the principles of the invention.
Figure 2:
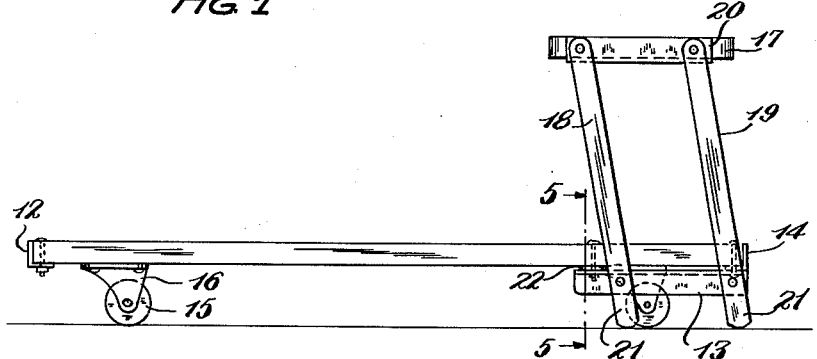
Fig. 2 is a side elevation of the creeper of Fig. 1, showing the seat support in operative position.
Figures 3, 5:
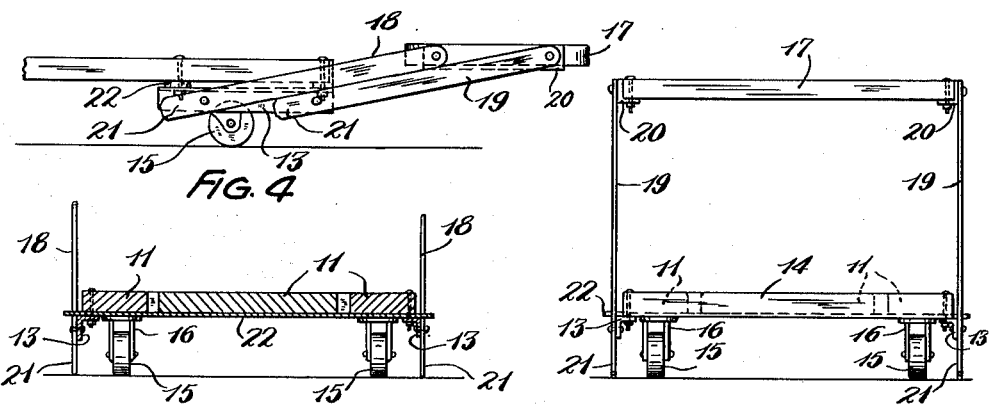
Fig. 3 is a right end elevation of the creeper of Fig. 1.
Fig. 5 is a fragmentary vertical section taken on line 5—5 of Fig. 2.

Reference now should be had to the details of the structure shown in the drawings and there is shown a creeper indicated generally by the numeral 10, which creeper embodies certain novel principles of the invention. The creeper 10 includes a plurality of longitudinally extending boards 11 in the specific construction shown in the drawings and these boards 11 are secured together by an angle bar 12 at one end thereof whereas one angle bar 13 is secured to the edge of the boards 11 at the sides of the creeper and extends downwardly therefrom. The boards 11 are secured together at the front or top end of the creeper 10 by a cross bar 14. Figs. 2 and 3 of the drawings clearly bring out that the cross bars 12 and 14 are positioned in a horizontal plane that is defined by the boards 11 whereas the side bars 13 extend downwardly from this horizontal plane for a purpose to be explained hereinafter in detail. Any conventional means may be used to secure the bars 12, 13 and 14 to each other and/or to the boards 11. It will be realized that these bars and boards may be considered to combine and form the frame for the creeper 10, although if desired a separate frame device could be provided using means similar to the bars 12, 13 and 14 and have the support boards or sheet secured to this support frame in any desired manner.

Conventional roller support means are provided for the creeper of the invention and in this instance a plurality of casters 15 are secured by mounting brackets 16 to the support boards 11 adjacent the corners of the creeper 10.

An important element of the present invention resides in a seat or head rest 17, which may be formed from any desirable material and which is pivotally associated with the remainder of the creeper device for movement thereon from a position extending substantially continuously from the frame of the creeper to form an extension thereof at the head end of the creeper device, or to a position wherein the head rest 17 is swung up over a portion of the creeper 10 to form a seat support therefor. The head rest 17 preferably is secured to the remainder of the creeper by means of two pairs of support arms 18 and 19, with one arm 18 and one arm 19 being positioned on each side of the creeper 10 adjacent the head or front end thereof. Pivotal connection of one end of each of the pairs of support arms to the head rest 17 may be facilitated by the provision of angles 20 which are engaged with the side edge portions of the head rest 17 in any conventional manner. The upper end of each of the support arms 18 and 19 is pivotally secured to the side angle 20 whereas the opposite end of each support 18 is pivotally secured, as by riveting, to the downwardly extending portion of the side angle bar 13.

A salient feature of the present invention is that the support arms 18 and 19 all have portions 21 thereof extending therefrom, as best shown in Fig. 2, to a point protruding beyond the lower portion of the casters 15. Thus the support arms 18 and 19 are pivotally secured intermediate their ends to the side bars 13 and protrude downwardly therefrom a relatively long distance so that when the head rest 17 is swung upwardly of the creeper of the invention to its extreme position, as shown in Fig. 2, then the ends 21 of the support arms 18 and 19 are adapted to bear on any support provided for the creeper 10 and to raise the casters 15 adjacent such portion of the creeper slightly whereby a load on the creeper 10 is at least partially carried by the portions 21 of the support arms 18 and 19 so that the creeper is automatically locked in a given position and roller movement thereof is prevented while the head rest 17 is in its vertically uppermost position. The lowest end of the support arms 18 and 19 may be formed of any desired contour to facilitate engagement of same with the floor carrying the creeper 10 when the arms are substantially normal to the plane of the creeper.

It is important that the movement of the head rest 17 be definitely limited with relation to the remainder of the creeper 10 and to this end, a flat crossbar 22 is suitably secured to the side angles 13 and extends transversely of the boards 11 adjacent the front end of the creeper 10. This crossbar 22 is provided with end portions that protrude laterally beyond the support arms 18 and 19 and a vertical plane defined thereby. Figs. 3 and 5 of the drawings best show that each pair of support arms 18 and 19 define a vertical plane adjacent the side portions of the creeper 10 and these arms may be swung to and from their extreme substantially horizontal and substantially vertical positions while lying in the plane defined thereby. Fig. 2 of the drawings best shows that the head rest 17 has been swung up over a dead center position wherein each of the arms 18 and 19 has moved to a position inwardly of the creeper with relation to a normal line extending from the plane of the creeper support boards 11, so that the head rest will effectively retain a given load position.

Figure 4:
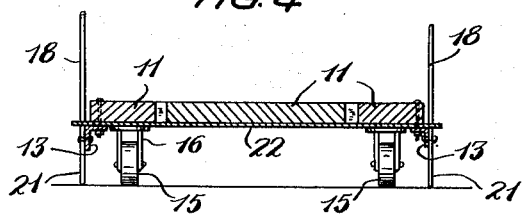
Fig. 4 is a fragmentary side elevation of the creeper of Fig. 1 with the movable seat support swung out into head rest position.

When the head rest 17 is in its extended position, the support arms 18 and 19 are adapted to contact each other along substantially their entire length and the support arms 19 will then support the arms 18 and prevent pivotal movement thereof beyond the position shown in Fig. 4. It will be realized that the locking extensions provided on the support arms 18 and 19 may be provided on one or both of such pairs of arms and in some instances might even be on only one support arm but the double and spaced support action of the ends 21 of the arms 18 and 19 on both sides of the creeper provides an effective, sturdy positioning of the creeper when the head rest is swung to its seat position. Preferably such extension would extend axially straight from the remainder of the support arm but other angular relation may exist.

Fig. 4 of the drawings best shows that the extension or support portion 21 of the axially inner support arm lies at least immediately adjacent and below the protruding stop provided by the ends of the cross bar 22. Such stop would aid in preventing further arcuate outward movement of the support arms 18 and 19 after they contact each other as shown in Fig. 4.

From the foregoing, it will be seen that a sturdy, novel type of a creeper has been provided wherein a movable head rest is furnished on the creeper with such head rest being adapted to be swung up for action as a seat on the creeper device. Also it will be noted that a locking action is automatically obtained to lock the creeper in a given position when the head rest is in or adjacent its seat support position. The creeper of the invention is sturdy, easy to assemble and is formed from inexpensive, uncomplicated parts so that the objects of the invention have been realized.

While one complete embodiment of the invention has been disclosed herein, it will be appreciated that modification of this particular embodiment of the invention may be resorted to without departing from the scope of the invention as defined by the appended claims.

Having thus described our invention, what we claim is:

1. In a creeper, a frame, first support means for supporting said frame, a head rest, a pair of support arms pivotally engaged adjacent one end thereof with each side of said frame adjacent an end thereof for movement to and from a position extending from one end of said frame, said support arms being pivotally secured at their other ends to corresponding sides of said head rest, each pair of said arms defining a vertical plane, and a fixedly positioned stop member positioned forwardly of both members of each pair of arms and extending laterally from said frame for automatically limiting movement of at least one arm of said pairs of arms inwardly of said frame after such arm has moved inwardly beyond its vertical dead center position, at least one of said arms having a downwardly extending support portion thereon for engaging the support for the creeper and at least partially taking the load off of said first support means to lock the creeper in a given position when said arms are engaged with said stop, the support portion of said arm extending downwardly farther of said frame than said first support means when said arm bears against said stop member.

2. In a creeper, frame means, roller means for supporting said frame means, a head rest, a pair of support arms pivotally engaged adjacent one end thereof with each side of said frame means adjacent an end thereof for movement to and from a position extending from one end of the said frame means, said support arms being pivotally secured at their other ends to corresponding sides of said head rest, each pair of said arms defining a vertical plane, said support arms being positioned on said frame means to stop, automatically, axial outward pivotal movement of such arms by the upper arm of each pair of arms bearing against the lower arm of each of said pairs of arms, said frame at least substantially defining a plane, said arms positioning said head rest substantially in the plane of said frame but with the axially innermost edge of said head rest being spaced axially from the adjacent end of said frame means to extend the effective length of the creeper when movement of said support arms is stopped by contact between members of the said pairs of said arms, and stop means on said frame means and protruding laterally therefrom axially inwardly of the creeper from the axially innermost of at least one of said support arms, at least said support arm adjacent said stop means having an extension portion extending axially inwardly of the creeper when said head rest is extended and lying at least immediately below said stop means which will aid in preventing continued pivotal movement of said support arms after contacting each other.

JOHN W. GRIFFIN.
SANFORD S. LAZARUS.

REFERENCES CITED

The following references are of record in the file of this patent:

UNITED STATES PATENTS

| Number | Name | Date |
|---|---|---|
| 177,526 | Lawrence | May 16, 1876 |
| 226,053 | Finnegan | Mar. 30, 1880 |
| 1,349,941 | Broome | Aug. 17, 1920 |
| 1,363,023 | Taylor | Dec. 21, 1920 |
| 1,419,067 | McCarthy | June 6, 1922 |
| 1,427,280 | Gahm | Aug. 29, 1922 |

FOREIGN PATENTS

| Number | Country | Date |
|---|---|---|
| 283,330 | Great Britain | Jan. 12, 1928 |